2,852,395
Patented Sept. 16, 1958

2,852,395
METHOD OF TREATING MEAT

Richard A. Gaumer, Kutztown, Pa., assignor of one-half each to William R. Mayo, Trexlertown, and Theodore Mayo, Catasauqua, Pa.

No Drawing. Application May 8, 1957
Serial No. 657,706

5 Claims. (Cl. 99—194)

This invention relates to methods of treating meat and more particularly to the production of a beef product in an improved form.

It is the principal object of the present invention to provide an improved method of treating meat, and particularly beef and the like, for the production of chipped steaks, cubed steaks and the like.

It is a further object of the present invention to provide an improved method of treating meat so that an improved product is obtained which is bright in color, attractive in appearance and highly palatable.

It is a further object of the present invention to provide improved methods of treating meat, and particularly beef, in which the steps employed are relatively simple and can readily be kept under control.

It is a further object of the present invention to provide improved methods of treating meat by which a product can be obtained which is attractive and salable and which can be made at a lower cost than similar products which are now available.

It is a further object of the present invention to provide improved methods of treating meat by which the nutritive constituents, including fat, are retained in the product resulting from carrying out the methods of treating the meat.

Other objects and advantageous features of the invention will be apparent from the description and claims.

The nature and characteristic features of the invention will be more readily understood from the following description, although it should, of course, be understood that various modifications and changes can be made in the steps disclosed without departing from the spirit of the invention.

In accordance with the present invention, fresh beef cuts are employed, preferably substantially dry, and preferably of a commercial or lower grade of beef, and while beef from cows and steers can be employed, with limitations hereinafter explained, it is preferred to use beef from young heifers or bulls.

The beef cuts, free from bones, are first prepared in suitable sizes for further working and finely ground with a conventional type of meat grinder with an orifice plate having openings of a diameter of the order of $1/4$ to $3/8$ inch, although smaller sizes, down to $1/16$ inch, can be employed. The meat, as thus ground, is then placed in a suitable container and is frozen so that the mass is completely in a frozen state throughout, the temperature for this purpose preferably being of the order of $0°$ F. to $-40°$ F., although operation at lower temperatures could be effected. There does not, however, appear to be any advantage in employing the lower limits of this range or still lower temperatures. While in this frozen state, the meat is then cut in a preferred manner, such as by power saws, or the like, and of a size such that the pieces can be reduced to powdered form in the frozen state. The size will be determined by the throat size of the equipment employed and where larger grinders are employed sawing may not be required if the pieces are of a size such that they can be inserted without sawing.

The powdered form is preferably the same in appearance, other than color, to ground wheat flour. The color will be determined by the temperature of the meat when it is reduced to powdered form and will range from pink, at the upper temperature limits, to white, at the lower limits stated.

While any preferred equipment can be used for effecting the production of the meat in powdered form, it has been found that if it is passed through a grinder having an orifice plate with holes of the order of $3/8$ or $1/4$ inch and with the temperature of the order of $0°$ F., or lower, the desired powdered state can be achieved. It has been ascertained that the powdering action can be achieved at temperatures as low as $-30°$ or $-40°$ F., but that a temperature of $-10°$ F. is quite satisfactory, and temperatures below that range merely require unnecessary refrigeration.

The meat in powdered form is then run, once or twice, through a comminuter, and for this purpose it has been ascertained that a fine grinder plate on a conventional meat grinder having orifices of a diameter of the order of $1/16$ or $3/32$ inch are satisfactory. As the meat is thus run through the grinder it is changed back into a somewhat adherent and homogeneous form, but this operation is preferably effected without substantial elevation in temperature, and with the temperature preferably retained at about $0°$ F. or lower. The comminuting or grinding operations just referred to are effective to blend the fat and gristle completely with the remainder of the meat so that the individual particles thereof are not visible to the eye. As the meat is delivered from the comminutor it is changed in appearance to a red color and sticks together with little tendency to fall apart. A slight or partial thawing action may occur because of this comminuting but not to an extent to raise the temperature above the freezing temperature, and preferably not above $0°$ F.

The homogeneous product thus obtained is immediately formed into the desired shape in cross section and elongated. For this purpose a press may be employed to form the meat into the shape to suit the subsequent operations or can be stuffed by hand into molds having the desired shape in cross section. The cross sectional shape can be circular, rectangular, with or without rounded corners, in the form of T-bone or other shapes of steaks, or in any other desired form.

If during the shaping operation the temperature of the material should become such that it is not in a completely solid state then it can again be subjected to freezing temperatures of $0°$ F. or below. Under usual conditions of operation this resubjection to freezing temperatures should not be necessary.

The solid and formed or shaped material thus obtained is then sliced while frozen, and at a temperature of about $0°$ F. to $-40°$ F., into pieces of the desired thickness of the order of $1/16$ to $1/8$ inch for chipped steaks, or thicker, if cubed steaks are desired, or still thicker if other final products are desired.

The meat is then, while still in frozen state, packaged, and is retained in packaged and frozen condition until ready for use.

While it has been indicated above that beef derived from various sources can be utilized, it has been found that beef from young heifers or bulls produces a product having and retaining a better bright red color, and free from brown spots which seem to develop, even in the frozen state of the finished products, if beef from steers or from cows is employed. Meat from steers and cows can be employed and brown spots avoided by careful use and maintenance in the product of lower temperatures rather than operation at the upper temperature limits stated above. The frozen product as thus obtained has a bright red color, substantially homogeneous throughout and with a somewhat velvety appearance, and retains its shape and does not readily crumble while in frozen condition. The flavor is unimpaired and, in fact, appears to be enhanced in the cooked product.

The manner of use of the frozen product varies with different users but customarily the meat in frozen form is introduced directly into the pan or onto a grill plate and subjected to heat for cooking in the manner customarily employed with chipped steaks, slices of beef, and the like.

This application is a continuation in part of my prior application, Serial No. 619,956, filed November 2, 1956, now abandoned.

I claim:

1. The method of treating meat which comprises reducing beef cuts to fine sizes and freezing the same to a rigid condition, cutting the frozen material into pieces and reducing the same to powdered form at a temperature in the range from about 0° F. to —40° F., comminuting the powdered material thus obtained in a plurality of separated portions without substantial increase in temperature and thereby changing the same to a homogeneous form, forming the homogeneous material thus obtained into the desired shape and, while the shaped material is in a rigid and frozen condition, slicing the frozen material.

2. The method as defined in claim 1 in which the beef cuts are from heifers and bulls.

3. The method of treating meat which comprises reducing beef cuts to fine sizes and freezing the same to a temperature in the range from about 0° F. to —40° F., cutting the frozen material into pieces and reducing the same to powdered form at a temperature in the range from about 0° F. to —40° F., comminuting the powdered material thus obtained in a plurality of separated portions without substantial increase in temperature and thereby changing the same to a homogeneous form, forming the homogeneous material thus obtained into the desired shape and, while the shaped material is at a temperature of about 0° F. to —40° F. slicing the frozen material.

4. The method as defined in claim 3 in which the beef cuts are from heifers and bulls.

5. The method of treating meat which comprises reducing beef cuts to fine sizes and freezing the same to a temperature of about 0° F. to —40° F., cutting the frozen material into pieces and reducing the same to powdered form at a temperature of from about 0° F. to —40° F., comminuting the powdered material thus obtained in portions having a diameter of the order of $\frac{1}{16}$ to $\frac{3}{32}$ inch without substantial increase in temperature and thereby changing the same to a homogeneous form, forming the homogeneous material thus obtained into the desired shape and, while the shaped material is at a temperature of 0. F. to —40° F., slicing the frozen material.

References Cited in the file of this patent

UNITED STATES PATENTS

| 2,242,451 | Carpenter | May 20, 1941 |
| 2,278,476 | Musher | Apr. 7, 1942 |
| 2,752,252 | Condon | June 26, 1956 |